Feb. 22, 1927.

H. E. HARKIN

AUTOMATIC CULINARY MACHINE

Filed March 21, 1923     4 Sheets-Sheet 1

1,618,190

INVENTOR.
HARRY E. HARKIN
BY
ATTORNEY

Feb. 22, 1927.  
H. E. HARKIN  
1,618,190  
AUTOMATIC CULINARY MACHINE  
Filed March 21, 1923    4 Sheets-Sheet 3

INVENTOR.  
HARRY E. HARKIN  
BY  
his ATTORNEY

Feb. 22, 1927.

H. E. HARKIN 1,618,190

AUTOMATIC CULINARY MACHINE

Filed March 21, 1923   4 Sheets-Sheet 4

INVENTOR.
HARRY E. HARKIN
BY
his ATTORNEY

Patented Feb. 22, 1927.

1,618,190

UNITED STATES PATENT OFFICE.

HARRY E. HARKIN, OF RIDGEFIELD PARK, NEW JERSEY.

AUTOMATIC CULINARY MACHINE.

Application filed March 21, 1923. Serial No. 626,463.

This invention relates to culinary machines and is for the purpose of automatically performing work that has heretofore been done by hand, and applies more particularly to such labor as the filling of pies and the like.

The particular embodiment hereinafter described and shown in the accompanying drawings is a pie filling machine, so constructed and arranged to function automatically by delivering in an effective way a measured quantity of filling into each successive pie shell, and automatically repeating the operation, for the purpose of eliminating the hand labor in that operation, and to supply uniformly a predetermined quantum of the respective character of filling desired. For the purpose of automatic actuation, the automatic measuring and delivering machine operates in conjunction with a movable table containing a plurality of the pie plates and shells ready to be filled, and the several functions necessary for complete automatic operation are thus coordinated with resultant economy and uniformity of product.

In the accompanying drawings forming a part hereof.

Figure 3:
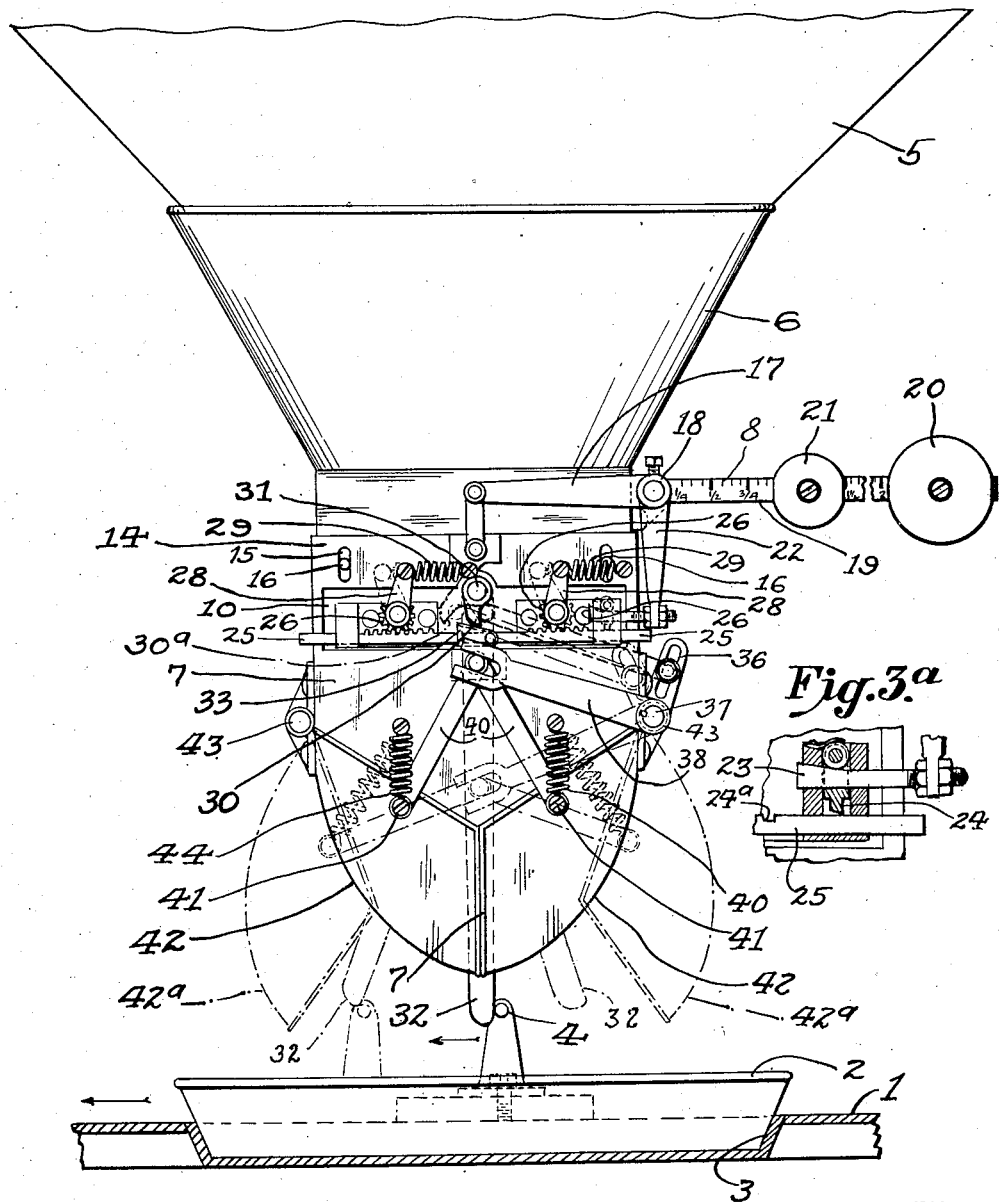
Fig. 3 is a fragmentary side elevation, on a larger scale, of hopper discharge bucket and receptacle.

Fig. 3ª shows the cut-off latch enlarged.

Figure 4:
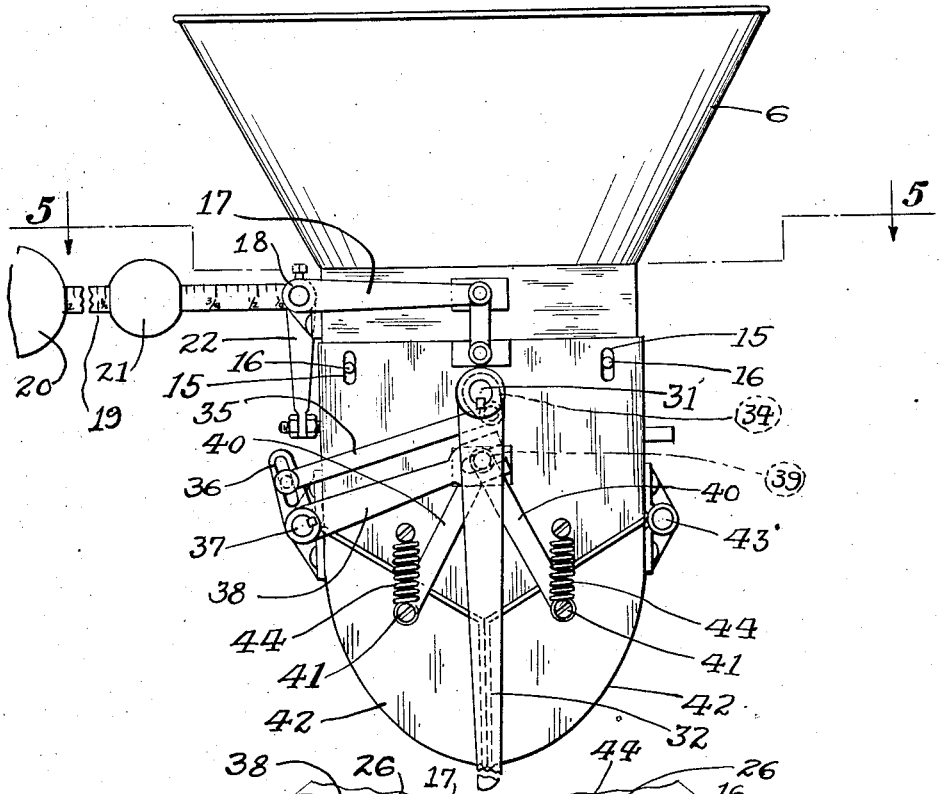

Fig. 4 is an elevation of hopper and bucket on the opposite side of Fig. 3.

Figure 5:
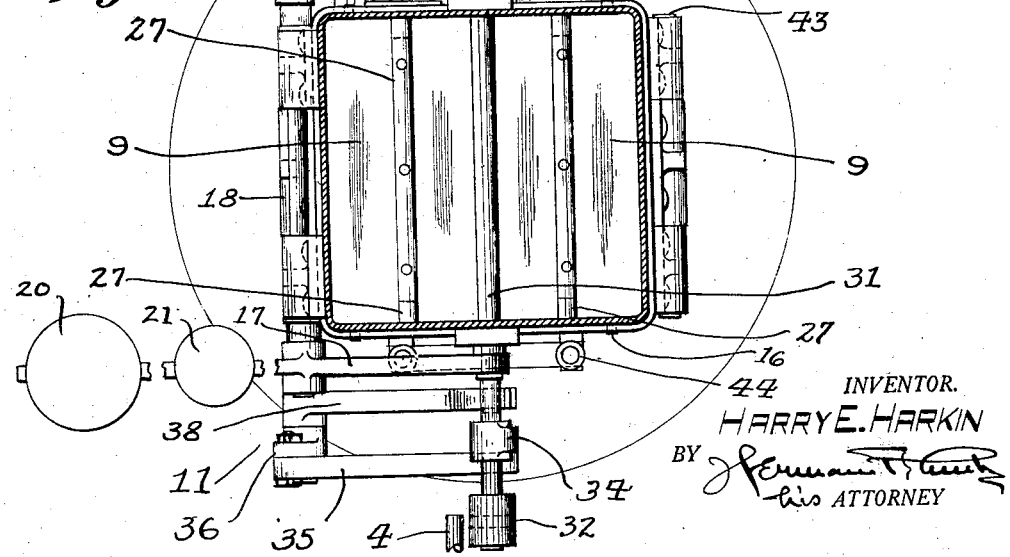

Fig. 5 is a horizontal section on line 5—5 of Fig. 4.

Figures 6, 7:
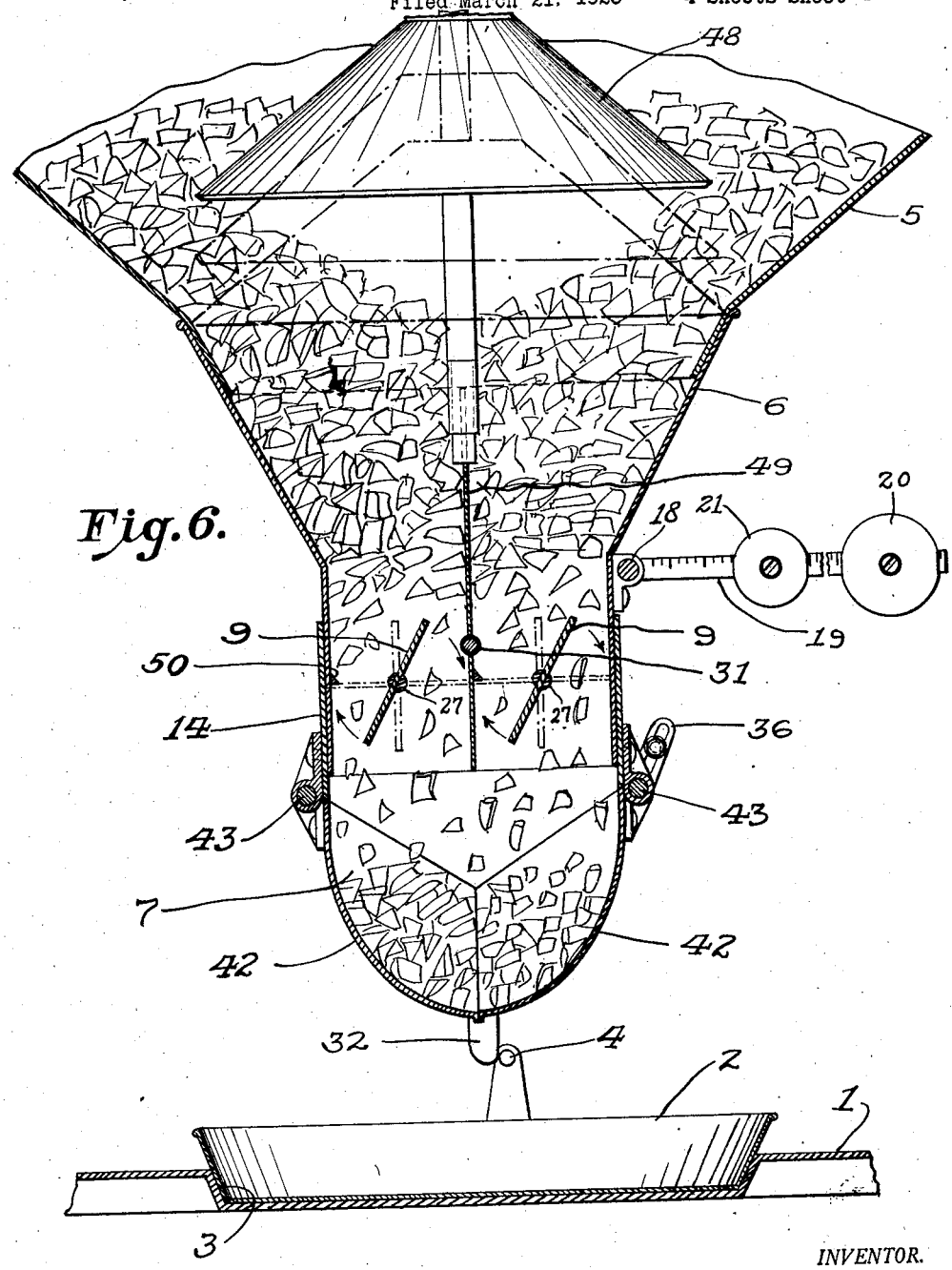

Fig. 6 is a vertical section on the axis of hopper and bucket shown in Fig. 3.

Fig. 7 is an alternate form of gate or closure.

The particular embodiment of this invention is shown in the accompanying drawings as a complete automatic pie filling machine, in which any suitable base of structure supports a rotating table 1, which has recesses around its periphery to carry pie plates 2 in recesses 3. This table is capable of controlled rotation, so that the various operations of pie making may proceed at different positions around the table with the operatives remaining stationary while the pie plates pass before them. Thus pie plates with the bottom shell or crust ready for filling reaches a position when ready to be filled, and at this predetermined position the automatic filling machine is located above the position of the pie to be filled.

The automatic filler is actuated by trips fastened to the rotating table, each trip being in a predetermined position with respect to the pie plate recess, so that the movement of the rotating table automatically trips the filling machine when the adjacent pie plate is in its position to receive the filling or contents, whether it be any of the usual ingredients such as apple or other fruits, or mince, or squash, etc. These trips may be adjustable so as to predetermine the point of opening of the filling machine with respect to the position of the pie, which may be different in handling different materials on account of variations in the flow and delivery of material.

The filling machine comprises the main parts, supply receptacle 5, hopper 6, bucket 7, weight-control mechanism 8, valves or shutters 9, automatic valve-closing mechanism 10, and automatic bucket-opening and closing mechanism 11.

In order that the specific construction and all its parts may be more readily understood, the general operation of the machine will be first described. Thus the receptacle 5, being a detachable member, is filled with a large quantity of the material to be put into the pies, having a capacity for filling a plurality, as, for example, one hundred pies. The bottom of this receptacle has a baffle 12, which in its lowest position constitutes a closure for the bottom of the receptacle and may be raised by the lever 13, after the receptacle is placed in operative position, the baffle being adjustable so that it may serve to suitably control the flow of the particular material being handled for the time being, in order that the delivery from the receptacle into the hopper can be made to suit the best conditions of operation.

The pie-filling material then passes through the hopper, which, as illustrated, leads into a substantially square chute that fits inside the top sleeve of the bucket. Where the material leaves this sleeve the movement is controlled by the valves which are shown as two balanced vanes or butterfly valves which serve to permit a controlling passage into the bucket, baffling the movement of the filling material to such an extent as may be necessary for good operation of the machine, and which valves are automatically closed by quick action the moment that predetermined weight of filling material has entered the bucket. When the valves are closed the bucket is ready to fill the pie shell, but does not open until the pie plate is underneath the bucket and the trip on the movable table actuates the control lever, which causes a quick-throw movement separating the shell parts of the bucket at the bottom, with a quick drop or deposit of the entire contents of a predetermined weight of material into the pie plate below. The dropping of the material relieves the bucket of the weight, and so soon as the pie plate has moved a predetermined distance with the movement of the table, the control lever is released and permits the immediate closing of the bucket shells. With the closing of the bucket shells, and if desired during the latter part of the closing operation, the control valves in the hopper sleeve are opened to the predetermined degree to permit the next charge of material to pass through and again load the bucket. As the material drips or flows through the valves, the weight which it adds to the bucket automatically actuates the valve-control mechanism which may be set to close at any desired weight of charge, such as fourteen, sixteen or eighteen ounces, depending upon the size of the pies or the character of material.

These operations are accomplished, in the embodiment shown, by the following mechanism:

The bucket 7 has a top skirt 14, with slots 15 engaging pins 16 set on the outside of the hopper sleeve, holding the bucket and hopper together, but permitting slight relative movement determined by the weight of the bucket and its contents. This bucket skirt is connected with links on either side to lever 17, supported for slight oscillation on a bearing 18 with the weight scale bar 19 extending in the opposite direction from the bearing and carrying two weights. The weight 20 is a tare weight which is adjustable to balance the dead-load of the bucket and mechanism, and the weight 21 is adjustable to be set for measuring the weight of each charge of material which it is desired to automatically weigh and discharge into each pie. A bell-crank lever 22 is rigidly associated with the scale-bar and arm 17, so that when the predetermined weight of fill in the bucket balances the weight 21, lever 22 oscillates and actuates a cam 23 which releases a pawl 24, and thereby trips a rack-bar 25 which has teeth engaging pinion teeth 26 mounted on shafts 27, which form the pivot of the valves 9 and to which they are rigidly attached, so that the actuation of the pinion teeth operates the valves. Bell-crank 28 is rigidly secured with relation to the butterfly shafts and pinion teeth, and each is connected at its outer end with a spring 29, while the other end of the spring is fixedly secured in a suitable way which tends to normally pull the bell-crank 28 in the direction for closing of the main valve in the bottom of the hopper. The turning of the main valves therefore moves the pinion teeth which engage the teeth on the rack 25, which causes the rack to be moved to the left, as seen in Fig. 3, to the limit position, but the rack is moved to the right to open the valves and this is accomplished by the cam 30 on the shaft 31 actuated by the main control-lever 32. The movement of this control-lever to the right, Fig. 3, correspondingly moves the cam 30 from the position, shown dotted, 30$^a$, during a short movement before it engages the spring pawl 33 pivoted on the rack 25, thereby driving the rack to the right and actuating the butterfly shaft valves, thereby opening those valves, and this movement of the rack bar is proportioned so that at a predetermined opening of the valves the spring-pressed pawl 24 engages a recess 24$^a$ in the rack bar, thus holding the valves open so long as the cam 23 does not trip the pawl 24. This latter condition exists when the hopper skirt 14 is held up by the tare weight 20 and when anything else than the allotted amount of filling material is in the bucket as determined by the control-weight 21. A slow or quick response to the automatic closing of the valve due to the control-weight, may be adjusted in various ways, one feature involving the adjustable connection between the cam bar 23 and the arm 22.

When the rack bar is locked in the set position for open valves, by pawl 24, the control-lever having moved to the right, Fig. 3, a sufficient distance to accomplish that purpose by the cam 30, then the control-lever 32 comes back to a vertical position or such position as will cause the cam 30 to ride over the high end of the spring-pawl 33, depressing the spring cam 33 so that it is held down by suitable detent out of engagement and out of the path of cam 30, until after the rack bar 25 shall have again moved to the left upon the closing of the main supply valves. This condition maintains until the bucket has again been opened and the cam 30 moved to the position 30$^a$, whereupon the spring-pawl 33 takes its elevated position ready for engagement by cam 30 in order to again set the rack bar, at the end of the closing operation of the bucket. Fig. 7 shows in section, a modified form of valve, namely a slide valve.

The opening of the bucket shells is started by trip 4 of the moving table (or when needed by voluntary hand movement), forcing the lever 32 to the left, Fig. 3, and to the right in Fig. 4, which turns shaft 31 and actuates the short crank 34, pulling rod 35 which is adjustably pin-connected in a slot in lever 36, which through shaft 37 turns bell-crank levers 38 on opposite sides of the bucket where they engage a pin 39 which constitutes the pivotal connection of opener arms 40. The pivot 39 may be guided in any suitable manner, preferably to move in a vertical direction, so that its downward movement tends to uniformly actuate arms 40 which at their other end are pin connected 41, respectively, with each of the two shell parts of the bucket, thereby forcing the opening of the bucket by a quick movement and a wide open throw of the two parts, as shown in dotted lines in Fig. 3. These two parts 42—42 are so curved or shaped, so that when pivoted on hinges 43 and thrown wide open, they provide for a clear throw of the contained material by gravity and a quick depositing of the filling material into the pie plate and shell below.

So soon as the pie table with its trip 4 has moved lever 32 a predetermined distance, the end of lever 32 rides over the top of trip, the springs 44—44 connecting the bucket shells with the body of the bucket, contract, thereby tending to immediately close the bucket shells, force up the links 40, throw up the bell-crank 38, and actuate the lever 36 and the rod 35 and turn the crank 34, thus oscillating the shaft 31 back toward its central position. With this return movement of shaft 31, cam 30 moves free until the bucket shells have largely closed, or it may be adjusted so that they are completely closed, and further movement of cam 30 in engagement with spring pawl 33 drives the rack bar 25 to the right, against the resistance of springs 29, thereby opening the butterfly valves 9 controlling the supply of filling and upon the predetermined movement, the rack bar is caught and held by locking pin 24. In this manner the automatically closed bucket is filled with any material that is coming through the hopper from the receptacle, until the weight of material in the bucket reaches the predetermined point necessary to counterbalance weight 21, whereupon the cam 23 is immediately actuated and automatically closes the butterfly valves 9 by a quick trip,—thus insuring the bucket loading of the exact predetermined weight of material desired for one charge, as, for example, for one pie.

Figure 1:
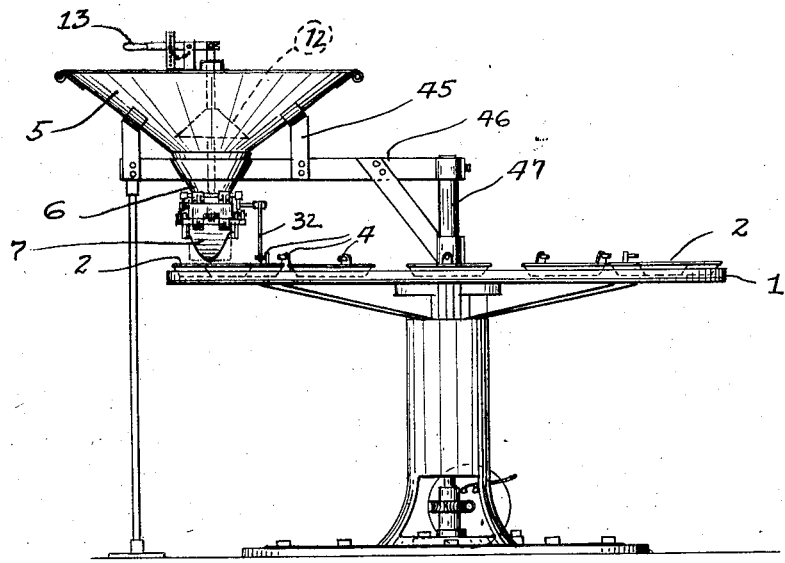
Fig. 1 is a side elevation of the complete machine equipment.
Figure 2:
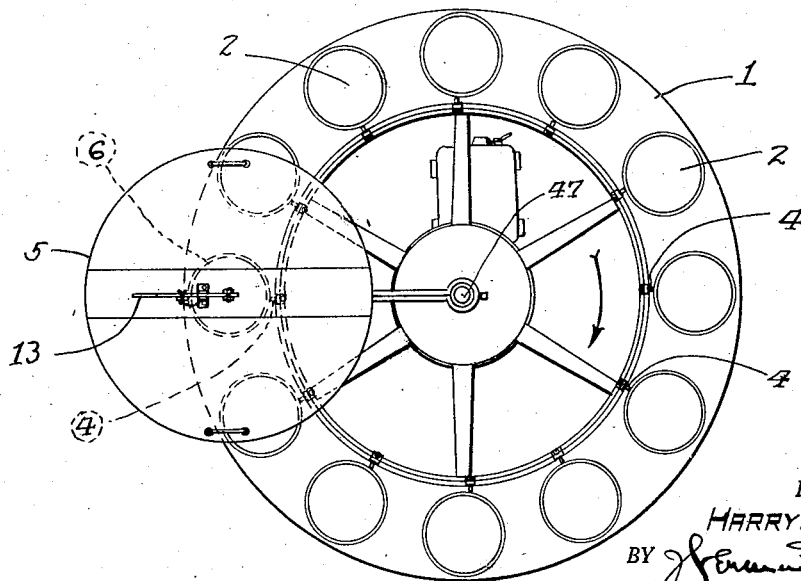
Fig. 2 is a plan view of Fig. 1.

As shown in Fig. 1 the receptacle and hopper are supported in their position relative to the turntable, by a suitable bracket 45 on an arm 46 carried on a post at the centre of the table, in a suitable manner to prevent any interference with the normal operation of the turntable, while any suitable support to rigidly carry the maximum load contemplated for the receptacle, and holding it and the hopper in proper relation to the table, may be arranged depending upon the conditions under which the machine is used.

The receptacle shown is flared so that it provides large cubic contents with a relatively low rim convenient for filling. The slope of the sides may be made with due regard to the viscosity of the material in order that the flow of the material into the hopper will be at substantially uniform pressure when the maximum contents, say, one hundred pounds is in the receptacle or when it has been largely discharged and the remnant is passing out of the receptacle. The regulation of flow, however, may be likewise controlled more or less, by the baffle 12 which would act as a closure while the receptacle is being filled away from the machine and will retain the material until it has been put in position nesting with the top of the hopper. If desired, a substantially cylindrical receptacle may be used with a contracted lower end, or any variation in form so arranged as to meet the required conditions. The baffle 12, preferably has a stem 48 projecting downwardly from the bottom, with a vane 49 at the lower extremity which serves to separate the flow of material through the hopper and to the valves, thereby providing more equal delivering of material to each valve, and particularly to form a parting wall in the passageway between the two valves. With the valves turning in the direction indicated by the arrows in Fig. 6, suitable stop 50 provides means for definitely limiting the closed position of one of the valves, thereby limiting the movement of the rack bar and consequently the closed position of all valves, but still leaving the passageway free to prevent the lodging of any filling material which would interfere with the tight closing of the opening.

It will thus be seen that this machine serves various purposes, among them, in particular, the discharging into each pie of a uniform quantity of material, discharging of the same automatically thereby saving labor, and it permits the handling of a large quantity of material with convenience and economy and under uniform conditions. As a specific example, about one hundred pounds of pie-filling cooked to the right degree and properly heated, is set on top of the hopper, the bottom closure is opened as soon as the pie-table is ready to operate, and the material flows through the hopper and through the valves until, say, fourteen ounces of material are in the bucket, whereupon the valves automatically close. The table then turning with a pie in the recess which comes under the filling machine, results in automatically opening the bucket and dropping the fourteen ounces a suitable distance so that it squashes onto the pie plate shell or bottom crust, the table moves the pie on and the bucket automatically closes and automatically sets the hopper valves for refilling. This continues until the receptacle is exhausted, whereupon an attendant removes the empty receptacle without in any way interfering with the continued operation of the machine, because the hopper has a sufficient capacity to provide for filling a number of pies, and to bridge the time necessary to remove an empty and replace a full receptacle on top of the hopper.

While the receptacle and hopper top have been shown circular in section, and flared, with a squared section forming the bottom of the hopper nesting in the top skirt of the bucket, and the bucket has been shown with two parts or shells for dumping,—many variations may be made to suit the requirements for different kinds of material or for different uses of the machine, or changes may be made to suit the desires of the manufacturer or user. Likewise many variations may be made with respect to any parts of the mechanism. While sheet metal, such as is usually used for culinary devices, lends itself most readily for the purposes of the different parts of the machine, such as spun and sheet aluminum or copper, the exact nature of material may be varied to suit the desires of those practicing this invention. Likewise under certain conditions the tripping lever may be manually operated, or capable at times of manual operation in order to effect the discharge of material at the right moment, and when so used, the economy and convenience of supplying the material will be present, and the automatic regulation of each charge will be automatic in the same way as though the entire mechanism was automatically actuated.

While the machine has been shown as primarily a pie-filling machine, the invention may be embodied in various modifications for other purposes advantageous in respect to the other uses for which it may be adapted.

What I claim and desire to secure by Letters Patent is:

1. An automatic culinary machine for delivering predetermined amounts of material, comprising a portable container to hold a source of supply of excess quantities, manual means to close the delivery exit of said container and adjust the exit for delivery, automatic means for controlling the delivery of measured quantities into a discharging device, and independently actuated means for periodically discharging the measured quantity.

2. An automatic culinary machine for delivering predetermined amounts of material, comprising a source of supply of excess quantities, automatic means for controlling the delivery of measured quantities into a discharging device, means for moving a dish thereunder, and means independent of the measuring control means for automatically releasing the measured quantity in conjunction with the automatically positioned dish.

3. A machine for automatically filling a plurality of vessels, comprising means for controlled movement of said vessels, a receptacle for material above one predetermined position of a vessel, and automatic means for measuring and withholding a measured quantity of filling material, and independent means for thereafter discharging the predetermined measured quantities of said material into each vessel successively by its movement into the predetermined position.

4. A pie filling machine comprising a hopper, an automatic valve in the bottom of the hopper adapted to close when a measured quantity of material has passed the valve, an opening and closing bucket immediately below said valve having means to automatically close it when empty and retain it in closed position when filled, a pie dish positioning-table adapted to move successive pie dishes immediately under the bucket, and automatic means cooperating with the movement of the table to open the bucket to drop and spread the entire measured contents of the bucket at once into the pie dish.

5. A pie-filling machine comprising a hopper, an automatic valve in the bottom of said hopper, cooperating walls to permit gravity discharge when said valve is open, a cooperating bucket below said hopper, means for automatically stopping the discharge from the hopper into the bucket and retaining the bucket closed, independent means for automatically opening the bucket when the hopper discharge is closed and means for automatically closing the bucket after it has discharged.

6. A culinary machine for automatic supply of regulated quantities of food-serving containers in the process of preparing pies or the like, comprising a vessel adapted for gravity discharge to contain excess supply of material and detachable from the machine with means for closing the discharge end when detached, a hopper for cooperating with said vessel and having a bottom discharge, a measuring bucket below said hopper, a valve in said hopper having automatic means to hold said bucket closed when the valve is open and holding the bucket closed when filled but subject to independent opening, means to move a pie dish or the like vertically under and a distance away from the bucket and cooperating means to actuate the bucket for instant discharge a distance above the pie dish, whereby as a pie dish or the like moves into position it will automatically cause the drop of the measured quantity of filling material from a sufficient height to cause the charge to spread throughout the pie.

7. An automatic apparatus for supplying the filling to pies or like food articles, comprising a removable receptacle containing a source of supply, means for gravity-feed of said supply through a valve into a discharger, a valve, means for closing said valve before opening the discharger, and means for automatically opening the discharger actuated by the relative position of the pie to be filled.

8. An automatic apparatus for supplying the filling to pies or like food articles, comprising a removable receptacle containing a source of supply, means for gravity-feed of said supply through a valve into a discharger, means for closing said valve before opening the discharger, and means for automatically closing the discharger.

9. A pie-filling machine comprising a receptacle adapted to contain a source of supply of filling material and feed the same by gravity, a valve control to regulate the gravity-feed, a hopper, automatic means controlled by said hopper for actuating said valve, means for periodically opening said hopper by the passing of a pie dish support thereunder and means for automatically closing said hopper.

10. A pie filling machine comprising a receptacle having inclined walls and cooperating means to regulate the flow of the filling material by gravity, automatic valve control below said receptacle cooperating with a fixed charge bucket, combining means for stopping the flow of material from the receptacle and holding a measured quantity in the bucket in closed position immediately under the valve, whereby free flow of material is provided to the exit end of the bucket, a full-bottom discharge closure for the bucket held otherwise in a horizontal stationary position, means for moving successive pie dishes horizontally to a position a short distance below and away from the bucket and means cooperating with the pie-moving means and independent of the measuring means to quickly open and provide a sudden discharge of the entire bucket contents through a space to provide momentum by gravity before striking the pie dish, whereby a charging of the pie is effected with a predetermined splash to automatically spread the filling machine as desired.

11. A culinary apparatus of the character described comprising means for periodically measuring automatically a predetermined charge of filling material, as for a pie or the like, means for supporting the charge a predetermined distance above the article to be filled, means cooperating with the positioning of the article and the charge to automatically cause the charge to be dropped and spread to fill the article to the required contour.

12. A pie-filling machine comprising means for automatically measuring a predetermined charge of filling material and holding the same suspended over a pie dish intended to be filled, means for moving the pie dish co-acting with the suspended charge container to automatically cause quick dropping of the entire charge a sufficient distance when the pie plate is in filling position, whereby the measured charge will spread and fill the pie dish to the predetermined contour.

13. A method of automatically filling pies or the like, consisting of measuring a predetermined quantity of filling material, automatically bringing successive pie plates directly under the measured quantity, suddenly discharging the measured quantity of filler, and thereafter automatically closing the charge container and automatically moving the filled pie out of registration therewith and a new unfilled pie into vertical registration for subsequent filling.

In testimony whereof, I have signed my name to this application this 10th day of March, 1923.

HARRY E. HARKIN.